Patented Dec. 14, 1943

2,336,843

UNITED STATES PATENT OFFICE 2,336,843

CYANINE DYE CONTAINING A TETRAHYDROBENZOTHIAZOLE NUCLEUS

Leslie G. S. Brooker and Frank L. White, Rochester, N. Y., assignors to Eastman Kodak Company, Rochester, N. Y., a corporation of New Jersey No Drawing. Original application November 9, 1939, Serial No. 303,618. Divided and this application November 19, 1942, Serial No. 466,188

7 Claims. (Cl. 260—240)

This invention relates to cyanine dyes containing a tetrahydrobenzothiazole nucleus and to a process for preparing the same. This application is a division of our copending application Serial No. 303,618, filed November 9, 1939.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain. A number of cyanine dyes containing benzothiazole nuclei as one or both of the aforesaid heterocyclic nuclei are known.

We have now found that it is possible to prepare certain unsymmetrical carbocyanine dyes in which one of the aforesaid auxochromic nitrogen atoms lies in a 4,5,6,7-tetrahydrobenzothiazole nucleus and the other auxochromic nitrogen atom lies in a benzothiazole or benzoxazole nucleus. We have further found that these new cyanine dyes sensitize photographic emulsions strongly and cleanly, i. e. without producing excessive fog.

It is, accordingly, an object of our invention to provide new carbocyanine dyes. A further object is to provide a method for preparing such dyes. A further object is to provide photographic emulsions sensitized with such dyes. Other objects will appear hereinafter.

As starting materials for the preparation of our new dyes, we employ 2-methyl-4,5,6,7-tetrahydrobenzothiazole. We first convert this into a quaternary salt by reacting the base with an ester, such as an alkyl halide, an alkyl sulfate or an alkyl-p-toluenesulfonate, for example.

To prepare unsymmetrical carbocyanine dyes from the 2-methyl-4,5,6,7-tetrahydrobenzothiazole quaternary salts, we react the quaternary salts with benzothiazole or benzoxazole quaternary salts containing a β-arylaminovinyl group in the alpha position, in the presence of an acid binding agent, e. g. pyridine.

The following examples will serve to demonstrate the manner of obtaining our new dyes. These examples, however, are not intended to limit our invention.

EXAMPLE 1.—3,3'-diethyl-4',5',6',7'-tetrahydrooxathiacarbocyanine iodide

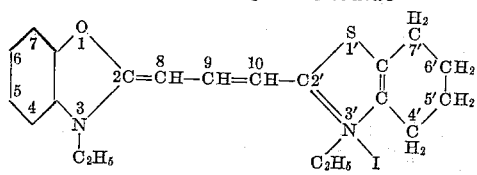

3.53 g. (1.1 mol.) of 2-methyl-4,5,6,7-tetrahydrobenzothiazole etho-p-toluenesulfonate and 3.95 g. (1 mol.) of 2-(β-acetanilidovinyl)-benzoxazole ethiodide were mixed together in 15 cc. of dry pyridine. The resulting mixture was gently boiled, under reflux, for about 10 minutes. The reaction mixture was then cooled and diluted with 150 cc. of diethyl ether. The ethereal layer was decanted and the residue was stirred with 50 cc. of hot acetone. The resulting acetone suspension was chilled to 0° C. and the dye was filtered off and washed with cold acetone. The dye was allowed to dry in the air. The yield of crude dye was 45% and after two recrystallizations from methyl alcohol (45 cc. per gram of dye), a 26% yield of pure dye was obtained. The pure dye was obtained in the form of dark purple crystals having a blue reflex and melting at 247° to 248° C. with decomposition.

EXAMPLE 2.—3-ethyl-3'-methyl-4',5',6',7'-tetrahydrothiacarbocyanine iodide

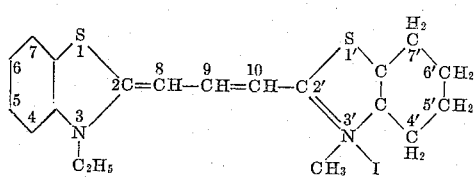

4.42 g. (1.3 mol.) of 2-methyl-4,5,6,7-tetrahydrobenzothiazole metho-p-toluenesulfonate and 4.5 g. (1 mol.) of 2-(β-acetanilidovinyl)-benzothiazole ethiodide were mixed together in 15 cc. of dry pyridine. The resulting mixture was gently boiled, under reflux, for about 10 minutes. The reaction mixture was then chilled and the crystalline dye which separated was filtered off, washed with acetone and allowed to dry in the air. The yield of crude dye was 62% and after recrystallization from methyl alcohol (75 cc. per gram of dye), a yield of pure dye of 42% was obtained. The pure dye was in the form of dark green needles having a blue reflex and melting at 273° to 274° C. with decomposition.

2-methyl-4,5,6,7-tetrahydrobenzothiazole can be prepared as described by Smith and Sapiro in Transactions of the Royal Society of South Africa, vol. 18, pages 229–235 (1929).

Quaternary salts of 2-methyl-4,5,6,7-tetrahydrobenzothiazole can be prepared as illustrated in the following examples.

EXAMPLE 3.—*2-methyl-4,5,6,7-tetrahydrobenzothiazole ethiodide*

1.53 g. of 2-methyl-4,5,6,7-tetrahydrobenzothiazole and 2.0 g. of ethyl iodide were heated together, under reflux, for about 24 hours. The solid reaction product consists essentially of the quarternary salt and can be used without further purification.

EXAMPLE 4.—*2-methyl-4,5,6,7-tetrahydrobenzothiazole etho-p-toluenesulfonate*

3.06 g. of 2-methyl-4,5,6,7-tetrahydrobenzothiazole and 4.0 g. of ethyl-p-toluenesulfonate were heated together at 100° C. for four days. The solid reaction product consists essentially of the quaternary salt and can be used without further purification. The metho-p-toluenesulfonate can be similarly formed by using methyl instead of ethyl-p-toluene-sulfonate.

To sensitize photographic silver halide emulsions with our new dyes, we disperse the dyes in the emulsions. Our invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art. In practicing our invention, it is convenient to add the dyes from solutions in appropriate solvents. Methanol has proven satisfactory as a solvent for our new dyes. The dyes are advantageously incorporated in the finished, washed emulsions and should be uniformly distributed throughout to secure best results.

The concentration of our new dyes in the emulsions can vary widely, e. g. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion sensitized with one of our new dyes, the following procedure is satisfactory: a quantity of the dye is dissolved in methyl alcohol, and a volume of the solution (which may be diluted with water) containing from 5 to 100 mg. of dye is slowly added to about 1000 cc. of a gelatino-silver-halide emulsion with stirring. Stirring is continued until the dye is uniformly dispersed. With the more powerful of our new sensitizing dyes, 10 to 20 mg. of dye per 1000 cc. of emulsion suffice to produce the maximum sensitizing effect with the ordinary gelatino-silver-halide emulsions. The above statements are only illustrative and not to be understood as limiting our invention in any sense, as it will be apparent that our dyes can be incorporated by other methods in many of the photographic emulsions customarily employed in the art, such, for instance, as by bathing the plate or film upon which the emulsion is coated, in a solution of the dye in an appropriate solvent, although such a method is ordinarily not to be preferred. The claims are intended to cover any combination of these new dyes with a photographic silver halide emulsion whereby the dyes exert a sensitizing effect on the emulsion.

The following table contains data which show the sensitizing range of our new dyes on photographic silver halide emulsions:

TABLE

| Emulsion | Dye (mg. per liter of emulsion) | Sensitivity extends to— | Maximum sensitivity |
|---|---|---|---|
| | | $M\mu$ | $M\mu$ |
| Gelatino-silver-bromiodide (about 40 g. of silver halide per liter of emulsion). | 3,3'-diethyl-4',5',6',7'-tetrahydro-oxathia-carbocyanine iodide 10 mg. | 595 | 560 |
| Do | 3-ethyl-3'-methyl-4',5',6',7'-tetrahydro thiacarbocyanine iodide. 10 mg. | 640 | 600 |

Photographic elements comprising our new dyes can be prepared in the usual manner by coating the emulsions on a suitable support (e. g. glass, cellulose derivative film, resin film or photographic paper) to suitable thickness and drying the coated emulsion.

It is well known that cyanine dyes resonate between two extreme forms and that a cyanine dye can be represented by either of the two extreme forms. Thus, the instant dyes can be represented by either of the following general formulas:

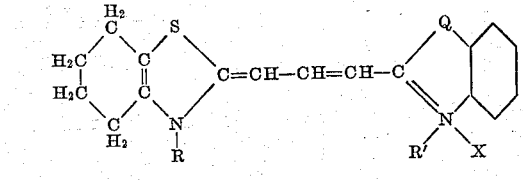

or

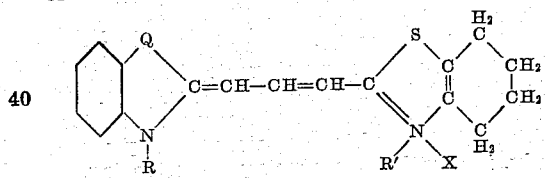

What we claim as our invention and desire to be secured by Letters Patent of the United States is:

1. A dye selected from the group characterized by the following general formula:

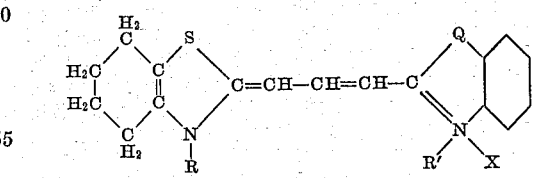

wherein Q represents a member selected from the group consisting of oxygen and sulfur atoms, R and R' represent alkyl groups and X represents an acid radical.

2. A dye selected from the group characterized by the following general formula:

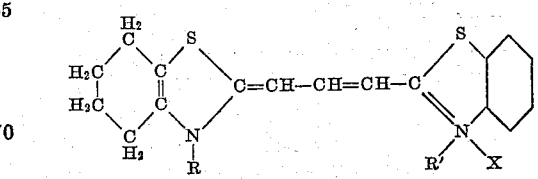

wherein R and R' represent alkyl groups and X represents an acid radical.

3. A dye selected from the group characterized by the following general formula:

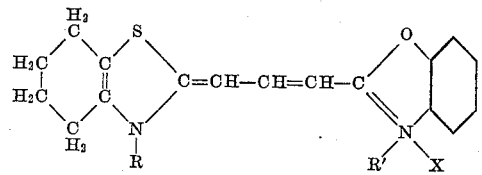

wherein R and R' represent alkyl groups and X represents an acid radical.

4. 3-ethyl-3'-methyl-4',5',6',7'-tetrahydrothiacarbocyanine iodide.

5. 3,3'-diethyl-4',5',6',7'-tetrahydro-oxathiacarbocyanine iodide.

6. A 3-ethyl-3'-methyl-4',5',6',7'-tetrahydrothiacarbocyanine salt.

7. A 3,3'-diethyl-4',5',6',7'-tetrahydro-oxathiacarbocyanine salt.

LESLIE G. S. BROOKER.
FRANK L. WHITE.